Aug. 24, 1965  W. L. TACK  3,202,406
FURNACE APPARATUS AND CONVEYOR THEREFOR
Filed July 27, 1960  2 Sheets-Sheet 1

INVENTOR.
WILLIAM L. TACK

BY
ATTORNEY

Aug. 24, 1965   W. L. TACK   3,202,406
FURNACE APPARATUS AND CONVEYOR THEREFOR
Filed July 27, 1960   2 Sheets-Sheet 2
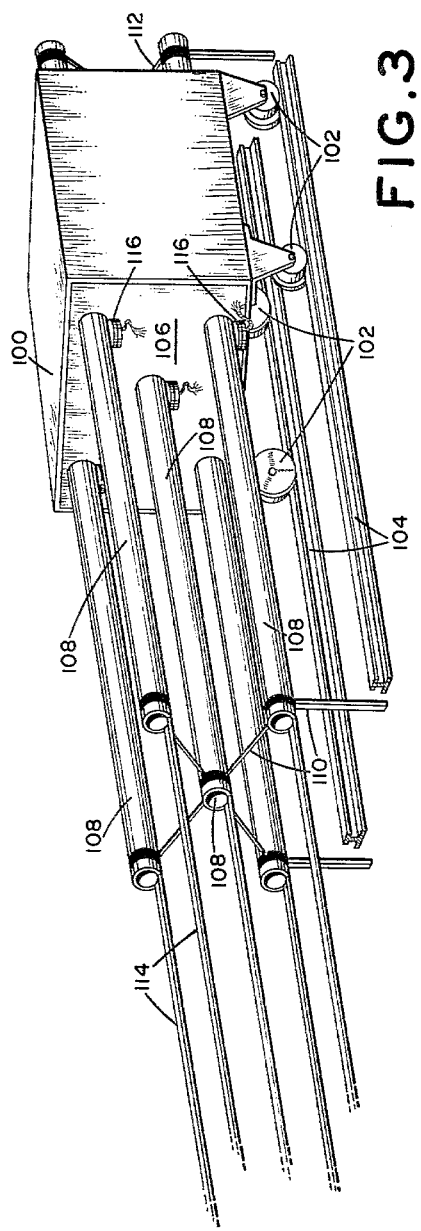
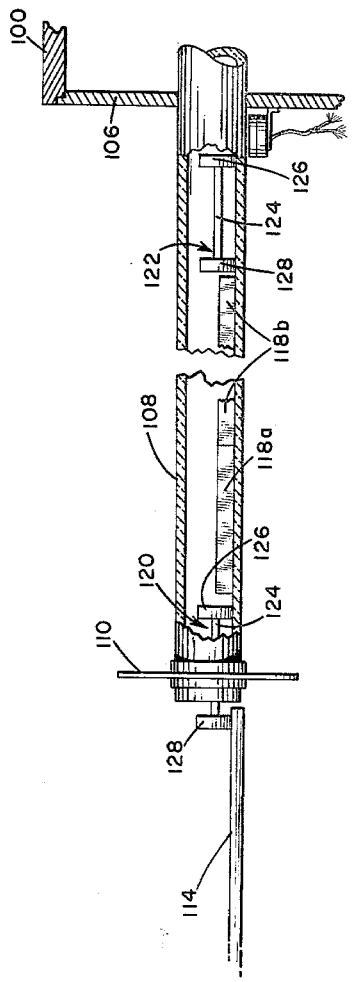
INVENTOR.
WILLIAM L. TACK
BY
ATTORNEY United States Patent Office 3,202,406
Patented Aug. 24, 1965

3,202,406
FURNACE APPARATUS AND CONVEYOR
THEREFOR
William L. Tack, Lexington, Mass., assignor to Clevite
Corporation, a corporation of Ohio
Filed July 27, 1960, Ser. No. 45,640
9 Claims. (Cl. 266—5)

This invention relates generally to conveyor apparatus and more particularly to conveyors for loading and unloading materials into and out of furnaces, ovens, or similar enclosures employed for treating, reacting, or otherwise operating on the materials.

For ease and clarity of presentation the invention will be described specifically in its relation to the manufacture of semiconductor devices, viz., for loading and unloading an alloying furnace of the quartz tube type. It will be appreciated, however, that the basic principles of the invention are of broader application.

One of the most widely used techniques, for forming PN junctions in semiconductor devices at the present time involves alloying to the faces of a wafer or die of semiconductor material a pellet or preform of a suitable acceptor or donor material (e.g., indium is frequently used in germanium devices). The alloying is accomplished by placing the semiconductor wafer and pellet assemblies in an alloying fixture usually referred to as a "boat" and placing the loaded boat into an alloying furnace or oven. Alloying furnaces widely used at the present time are of the quartz tube type. These consist of an insulating enclosure, with suitable heat supply means, through which extends one or more relatively long quartz tubes.

The alloying boats have an external configuration adapting them to slide into the quartz tube. Each boat is loaded with a number of wafer-pellet assemblies to be alloyed and a number of boats pushed into the quartz tube by an operator using a short ramrod. Unloading is effected with the help of a long hooked rod. Unloading the boat is a particularly cumbersome procedure. The operator must reach the hooked rod into the tube over a line of boats in order to hook the last boat and pull the boats out entrain. This requires a very deft manipulation of the rod by the operator; any misstep may result in tipping of the boats in the tube.

It is the fundamental object of the present invention to provide conveying apparatus which overcomes or mitigates at least one of the difficulties of the prior art as described above.

Another object is the provision of apparatus for conveying objects into, out of, and along a passage-way of relatively great length and small cross-sectional dimensions.

Another object is the provision of apparatus for loading and unloading a tube-type alloying furnace.

A further object is the provision of apparatus for conveying objects along an enclosure without mechanical connections thereto or physical contact therewith.

These and further objects are accomplished by a conveyor apparatus in accordance with the present invention which comprises non-magnetic means defining an elongated laterally enclosed passage-way adapted to slidably receive therein objects to be transported therealong; a guide member is disposed entirely outside of and extending substantially parallel to the passage-way; and magnetic flux generating means are provided, movable along the guide means and possessed of sufficient strength to magnetically attract a magnetic object within the passage-way and translate such an object therealong.

Additional objects of the invention, its advantages, scope, and the manner in which it can be practiced will be more readily apparent to persons conversant with the art from the following description of exemplary embodiments taken in conjunction with the subjoined claims and the annexed drawings wherein like reference characters designate like parts throughout the several views and wherein:

FIGURE 3 is a perspective elevation, somewhat schematic in form, of modified apparatus in accordance with the invention; and FIGURE 4 is a sectional view of a portion of the apparatus shown in FIGURE 3 on an enlarged scale.

Figure 1:
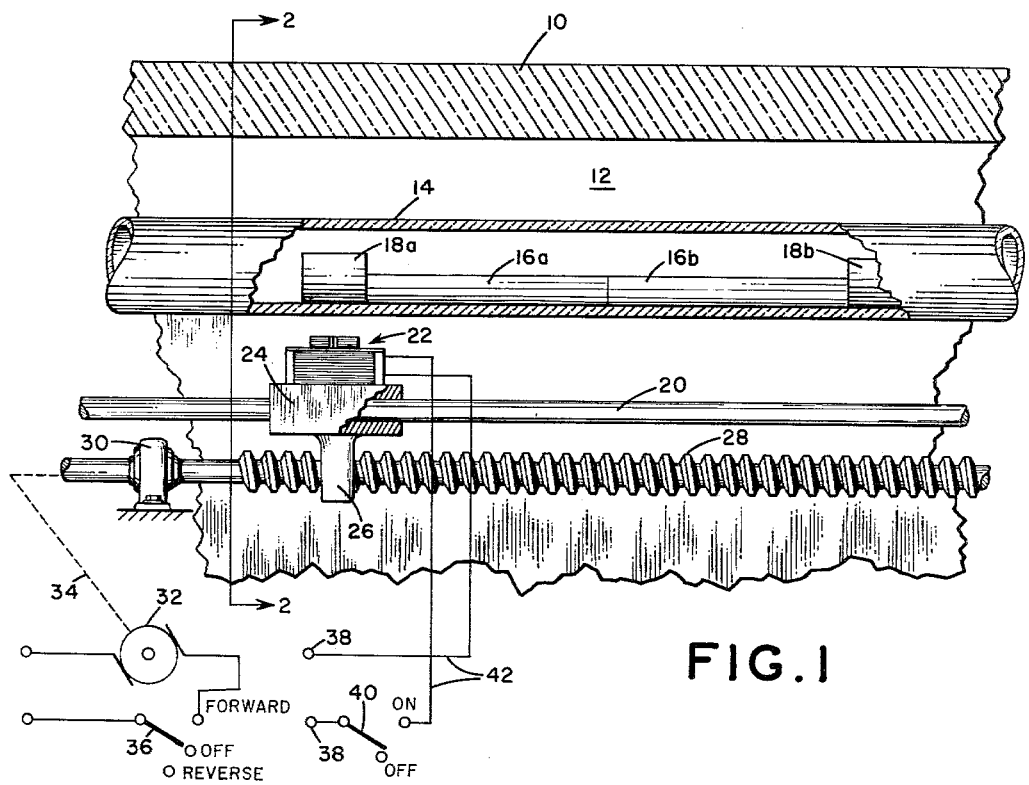
FIGURE 1 is of fragmentary schematic representation, partly in section, of apparatus in accordance with the present invention as viewed from one side.
Figure 2:
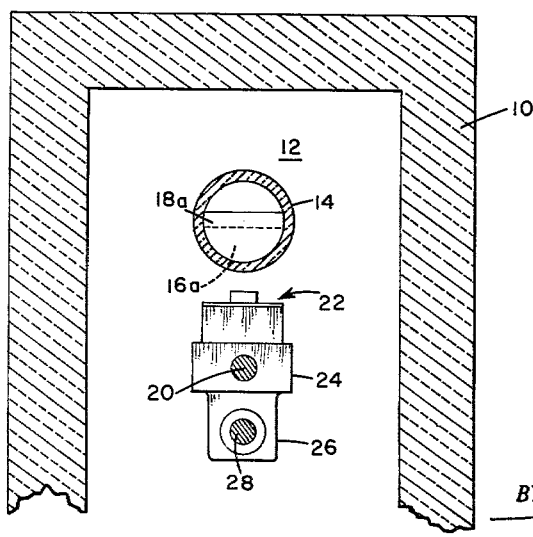
FIGURE 2 is a cross-sectional view taken on line 2—2 of FIGURE 1 looking in the direction of the arrows.

Referring to the drawings and first, in particular, to FIGURES 1 and 2, there is illustrated a fragment of a wall 10 of an alloying furnace embodying the present invention. Wall 10 is made of any suitable refractory, heat-insulating material and represents the oven or furnace enclosure. Within the furnace chamber 12 enclosed by wall 10 there may be radiant electric heaters (not shown), or other suitable means may be provided, within or outside of the enclosure, for heating the interior of the furnace. Ordinarily, chamber 12 is of considerable length and has lateral, or transverse, dimensions on the order of several times smaller than its length.

Extending longitudinally through chamber 12 is a relatively thin-walled quartz tube 14 fixedly mounted at its ends within enclosure 10 by any suitable means, not shown. In quartz tube furnaces of the type being described at least one end of quartz tube 14 must be accessible from the exterior of enclosure 10 to permit loading and unloading.

Ordinarily there is some provision made for controlling the atmosphere within quartz tube 14, usually to provide an inert atmosphere. This may be done by control of the atmosphere in the whole of furnace chamber 12, i.e., where the quartz tube is open to communication with the interior of the furnace, or by isolating the interior of the tube from the furnace chamber and supplying the requisite atmosphere in the tube only.

In the drawings quartz tube 14 is shown as containing two alloying boats 16a and 16b placed end-to-end. These alloying boats must be made of some refractory material which does not react with the semiconductor nor the alloying material loaded into them and fulfill other technical and practical requirements of the art of fabricating semiconductor devices. In commercial production graphite boats are almost universally used at the present time, at least in the production of germanium semiconductor devices. Quartz boats also are used to some extent.

As previously explained the alloying boats are filled with the wafer-pellet assemblies to be alloyed and several of the boats loaded end-to-end into the quartz tube. Heretofore this has been accomplished by the use of a ramrod.

In accordance with the present invention one or more blocks of magnetic material are placed in the tube entrain with the boats. In the illustrated embodiment two magnetic blocks 18a and 18b are shown, one at each end of the train of two boats 16a, 16b. It will be appreciated that in actual practice several boats may be contained in the tube but the invention is of course applicable even with a single boat. The blocks or slugs 18a and 18b of magnetic material may be of any suitable shape but preferably would have a cross-sectional configuration substantially the same as that of the quartz tubes, to allow maximum proximity to the magnetic field. To conserve space within the tube the axial dimension of the slugs would be as short as feasible. Preferably the slugs 18a and 18b are of magnetic materials having a Curie temperature higher than the maximum temperature to which they are exposed within chamber 12. As will be apparent to those skilled in the art the selection of said materials is a matter of design there being many commercially available magnetic materials suitable for the application disclosed. In the alloying of semiconductor devices with aluminum and aluminum silicon alloys the maximum temperature encountered would be less than 700° C. and the most common ferromagnetic substance, iron, which has a Curie temperature of 740° C. could be utilized in the fabrication of slugs 18a and 18b. Ferromagnetic materials having Curie temperatures much higher than iron are available if needed, e.g., cobalt—1120° C.

Disposed either within or without enclosure 10, but in any case outside of and somewhat spaced from the quartz tube 14, is a guide member which, in the illustrated embodiment, consists of a single cylindrical rod 20 supported at its ends (not shown), so as to extend substantially parallel to the axis of the quartz tube. In the exemplary embodiment being described, guide rod 20 is shown beneath tube 14 but it will be appreciated that design considerations may render a location above, or to the sides of, the tube preferable or necessary.

A magnetic flux-generating means which, in the exemplary embodiment takes the form of and is represented by an electromagnet 22, is provided. Electromagnet 22 is fixedly mounted on a carriage member 24 which in turn is slidably mounted on guide rod 20. In the even that the electromagnet is to be within enclosure 10, a suitable cooling system may be required.

On the underside of the carriage member 24 is a depending boss 26 containing a through aperture extending parallel to guide member 20 and having internal gear surfaces coacting with a worm shaft 28 mounted for rotation by suitable journal members at each end, one shown at 30. Worm shaft 28 runs parallel to guide rod 20, extending through and drivingly engaging the internal gear surfaces of boss 26. Thus it will be seen that rotary motion of worm shaft 28 causes carriage 24 to move longitudinally along guide rod 20.

Worm shaft 28 is driven from an electric motor shown diagrammatically at 32 by virtue of a suitable coupling represented by dotted line 34. An on-off/reversing control, represented by switch 36 in the electrical circuit of motor 32, enables the operator to start, stop, and select the direction of rotation of worm shaft 28 and, therefore, to control the movements of carriage 24.

Electromagnet 22 is connected to a suitable source of power (not shown) applied to terminals 38. The power supply circuit for electromagnet 22 contains an on-off switch 40 permitting the operator to energize or de-energize the electromagnet at will. While electromagnet 22 has been illustrated as being connected to a source of power by means of electrical conductors 42, this is merely for the sake of clarity of illustration. In actual practice it would be desirable to eliminate the need for trailing wires. This could be conveniently done by utilizing guide member 20 and worm shaft 28 as electrical conductors and supplying current to the electromagnet by means of suitable sliding contacts. Thus, for example, one side of the power source could be connected to rod 20 and the other to worm 28. One terminal of the armature of the electromagnet could then be connected to carriage 24 and thus to one side of the power supply by virtue of the sliding contact between the carriage and guide rod 20. Boss 26 on the underside of carriage 24, in such an arrangement, would be electrically insulated from the remainder of carriage and the other terminal of the electromagnet armature connected to the boss and, by virtue of the contact between the boss and worm 28, to the other side of the power source.

The operation of the apparatus is as follows, assuming that alloying boats 16a and 16b are loaded with the transistors in fabrication; furnace tube 12 is empty and is to be loaded and unloaded from its left-hand end; electromagnet 22 is de-energized; carriage 24 is at the extreme left-hand end of its travel; and motor 32 is inoperative: the operator first inserts magnetic block 18b into tube 14 (from the left as viewed in FIGURE 1). Block 18b is followed by whatever number of alloying boats are to be loaded, e.g., boats 16a and 16b; these, in turn, are followed by a second magnetic block, 18a. Electromagnet 22 is then positioned beneath block 18a by manipulation of carriage 24 through controls represented by switch 36. When in position, electromagnet 22 is energized and motor 32 switched to forward drive position, whereby carriage 24 and electromagnet 22 are translated to the right along guide rod 20. Due to the force of electromagnetic coupling between the magnet and magnetic block 18a, the block moves to the right within quartz tube 14 pushing ahead of it the train of alloy boats 16a, 16b and magnetic slug 18b. When the train reaches the desired position in tube 14, motor 32 is switched off. If desired, magnet 22 may be maintained energized and motor 32 switched into reverse so as to withdraw magnetic block 18a from the tube.

To unload the furnace, de-energized magnet 22 is moved along guide rod 20 until directly beneath block 18b at the forward end of the train. At this point the magnet is energized and motor 32 reversed so that carriage 24 and magnet 22, with block 18b magnetically coupled thereto, move to the left as viewed in FIGURE 1 pushing the train of boats back to the loading end of tube 14.

It will be appreciated that if desired the invention may be adapted to use in a straight-through furnace, i.e., one in which the boats are loaded at one end, move through the tube in one direction, continuously or intermittently, and withdrawn at the other end. A wide variety of other variations are possible. Thus, one or more additional magnet, carriage, guide, and worm drive assemblies may be provided above or beside tube 14. Such plural carriage assemblies can be arranged to operate jointly with or independently from each other. Thus, for example, one may be employed and designed specifically for loading and the other for unloading.

For greater flexibility in operation magnetic blocks may be interposed between each of the alloying boats so that the train may be broken at any point and the respective segments moved in opposite directions.

For more automatic though less flexible operation, energization of the magnet can be placed under the control of switches operated in response to the position of the carriage. Thus, for example, on the loading movement, the magnet could be automatically de-energized when block 18a reaches the desired location in tube 20 and automatically re-energized when it arrives under the magnetic block, 18b, at the forward end of the train. In addition, limit switches activated by the carriage can be employed in the control circuit of motor 32.

A modified type of apparatus embodying the invention may take the form of a multiple tube alloying furnace such as illustrated in FIGURE 3. The apparatus comprises a furnace enclosure 100 mounted on supporting wheels or rollers 102 for linear displacement along a pair of parallel tracks or guides 104. The forward wall 106 of the furnace and the back wall (not visible in FIGURE 3) contain respective, coaxially aligned apertures through which pass a plurality of relatively thin-walled quartz tubes 108 comparable to the single tube 14 in the previously described embodiment.

The forward ends of tubes 108 are supported in a fixed, spatial relation parallel with respect to each other and to furnace guide tracks 104, as by means of a suitable framework designated in its entirety by reference numeral 110. The rear ends of the tubes are similarly supported, a fragment of the rear supporting frame work appearing at 112.

As in the case of the embodiment already described, furnace enclosure 100 is fabricated of any suitable refractory heat-insulating material and contains radiant electric heaters (not shown) or other suitable means for heating the interior of the furnace enclosure. Disposed at the forward end of, and aligned with, each of the tubes are respective horizontal chutes or troughs 114, each of which terminates in close proximity to the particular furnace with which it is associated. Troughs 114 serve to facilitate loading and unloading of alloying boats into and out of the furnace tubes as hereinafter explained in greater detail.

As in the case of the first embodiment, electromagnetic flux-generating means are provided for each of tubes 108, taking the form of respective electromagnets 116 mounted in any suitable manner on the exterior of the forward wall 106 of furnace enclosure 100.

In the illustrated embodiment electromagnets 116 are illustrated as positioned beneath the respective tubes but it will be appreciated that, in any specific construction, it may be necessary or desirable to place the magnets to the sides or even above the respective tubes.

For the sake of simplicity, the electrical circuitry supplying power to, and controlling the energization of, electromagnets 116 have been omitted from FIGURE 3. However, it will be understood that means, such as shown in and described with reference to FIGURE 1 are provided for supplying power to the electromagnets and selectively switching such power off and on. Similarly, the drive system for translating furnace enclosure 100 along tracks 104 is not shown in FIGURE 3 but, again, it will be understood that any mechanical drive such as the worm and follower system illustrated in FIGURE 1 can be employed. Preferably such a system should provide not only a selection of three conditions, i.e., stop, forward and reverse, but also enable a selection of speeds in each direction. In addition, a suitable disengageable clutch or coupling means may be provided in the furnace transport system by means of which the furnace may be disengaged from its drive and moved manually; this arrangement is highly desirable in certain service situations to accelerate operation.

Referring now to FIGURE 4, one of the quartz tubes 108 is illustrated on an enlarged scale and broken away to reveal alloying boats 118a, 118b, contained therein. These boats, in all respects the complete counterparts of those already described with reference to FIGURES 1 and 2, are disposed in end-to-end abutment to form a train. At each end of the train of boats in tube 108 are magnetic pusher members 120, 122, which, while generally similar in function to the magnetic slugs 18a and 18b, FIGURE 1, are somewhat different in structure.

Each pusher member takes the general form of a dumbbell comprising a rod 124 of non-magnetic material interposed between, and coupling together, a slug 126 of magnetic material such as soft iron and a slug 128 of non-magnetic material. Rod 124 and non-magnetic slug 128 may be of ceramic, aluminum, or other non-magnetic material. The length of the rod is such that the outer end faces of slugs 126 and 128 are spaced apart by an amount approximately equal the distance of tube support frame 110 from the forward (left-hand as viewed in FIGURE 3) end of tube 108 in order that the entire train of boats may be pushed out of the tubes within the limits of travel imposed on furnace 100 enclosure by the tube support frame, as will more fully appear hereinbelow.

The operation of the modified form of apparatus illustrated in FIGURE 3 is as follows: the operator first moves the furnace enclosure 100 (to the right as viewed in FIGURE 3) to the back ends of tube 108 so that the forward portions are fully exposed. In order that this movement can be accomplished rapidly, enclosure 100 may be disengaged from its motor drive and pushed manually or the drive operated at high speed. If desired, respective pusher members 122 may be inserted into the tubes prior to movement of enclosure and the electromagnets energized so that the pushers are carried to the rear of the tubes with the enclosure. If this is not done the pusher members 122 are inserted into the tubes before any of the boats are introduced.

A train of loaded boats is then assembled in troughs or chutes 114 at the entrance of tubes 108. The loaded boats are then pushed into the tubes, one pushing the other until the tubes are loaded to capacity. Thereupon furnace enclosure 100 is moved forwardly to envelop the section of the tubes containing the trains of alloying boats. During this forward movement of the enclosure, which can be accomplished manually or using the motor drive, the electromagnets are de-energized so that the boats are not displaced.

After the alloying period has elapsed, the furnace enclosure is once again moved to its rearward position exposing the forward portions of the tube and the trains of boats. To unload the boats from the tubes, the electromagnets are energized and the motor drive engaged to move enclosure 100 forwardly (to the left in FIGURE 3). The magnetic flux is effective upon the respective magnetic slugs 126 of the pusher members, propelling said members to the left, thus pushing the boats out of the tubes onto the loading troughs. From an inspection of FIGURE 3 it will be apparent that the forward movement of the furnace enclosure (to the left as viewed in this figure) is limited by the presence of tube supporting framework 110. Nevertheless, due to the elongated construction of the pusher members 122 the entire train of boats is pushed completely out of the tube onto the loading troughs.

It is to be understood that variations are possible in the manner of operating the apparatus. Thus, for example, a pusher member 120 may be loaded into the tubes after a train of boats, as illustrated in FIGURE 3 and this employed to move the train of boats toward the rear of the tubes.

While the invention has been described specifically as applied to alloying furnaces of the quartz tube type it will be appreciated that it can be employed with advantage in a wide variety of particular apparatus requiring the translatory movement of objects of a non-magnetic nature through a passage or enclosure which renders them inaccessible to a direct mechanical coupling and requiring facile control and flexibility in operation. As one example, the invention can be employed to convey objects through a muffle tube furnace such as is sometimes employed in the firing of ceramics.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by U.S. Letters Patent is:

1. Alloying apparatus for semiconductor devices comprising: thermal insulating wall means enclosing a furnace chamber; an elongate enclosed member of non-magnetic refractory material extending through said chamber and adapted to slidably receive a plurality of semiconductor alloying boats having an outer cross-sectional configuration substantially conforming to the inner cross-sectional configuration of said enclosed member and being slidably receivable therein; guide rod means disposed externally of and extending parallel to said enclosed member; magnetic flux-generating means mounted for movement along said guide rod means; and at least a pair of magnetic bodies, adapted to be slidably received within said enclosed member and to be disposed therein at opposite ends of a train of the alloying boats; said magnetic means being operative to selectively position said alloying boats in opposite directions within said passage through selective magnetic attraction with said magnetic bodies.

2. Alloying apparatus for semiconductor devices, comprising: thermal insulating wall means enclosing a furnace chamber; an elongate passage-defining member of non-magnetic refractory material extending through said chamber adapted to slidably receive therein non-magnetic objects and conduct the same into said chamber; guide means, disposed externally of said furnace chamber and extending parallel to said passage-defining member, mounting said wall means for rectilinear displacement; magnetic parts adapted to be slidably received within said passage defining member entrain with the non-magnetic objects; electromagnetic flux-generating means mounted externally of and on said wall means adjacent said passage-defining members; means selectively operable to energize said electromagnetic flux-generating means; and means selectively operable to move said insulating wall means along said guide means.

3. Alloying apparatus for semiconductor devices, comprising: thermal insulating wall means enclosing a furnace chamber; a plurality of elongate passage-defining members of non-magnetic refractory material extending in spaced parallel relation through said chamber adapted to slidably receive therein non-magnetic objects and conduct the same into said chamber; guide means, disposed externally of said furnace chamber and extending parallel to said passage-defining members, mounting said wall means for rectilinear displacement; magnetic parts adapted to be slidably received within said passage defining members entrain with the non-magnetic objects; electromagnetic flux-generating means mounted externally of and on said wall means adjacent each of said passage-defining members; means selectively operable to energize said electromagnetic flux-generating means; and means selectively operable to move said insulating wall means along said guide means.

4. Conveyor apparatus comprising: non-magnetic means defining an elongated passage for the conductance of a mass to be conveyed; a pair of parts of magnetic material adapted to be slidably received within said passage on opposite sides of the mass in non-interconnected relationship therewith; guide means extending parallel to said passage exteriorly thereof; an electromagnet mounted for translatory movement along said guide means for selectively positioning said parts therewith by magnetic attraction whereby the mass may be selectively positioned in opposite directions in said passage; and means for selectively energizing and de-energizing said electromagnet.

5. Conveyor apparatus comprising: non-magnetic means defining an elongated passage adapted to slidably receive a plurality of non-magnetic articles; a pair of parts of magnetic material adapted to be slidably received within said passage on opposite ends of a train of the articles in non-interconnected relationship therewith; guide means extending parallel to said passage exteriorly thereof; an electromagnet mounted for translatory movement along said guide means for selectively positioning said parts therewith by magnetic attraction whereby the train of articles may be selectively positioned in opposite directions in said passage; and means for selectively energizing and de-energizing said electromagnet.

6. Conveyor apparatus comprising: non-magnetic means defining an elongated passage adapted to slidably receive a train of non-magnetic articles; guide means exteriorly of and extending parallel to said passage; a carriage member mounted on said guide means for translatory movement parallel to the axis of said passage; means for positioning said carriage along said guide means; means for selectively rendering said positioning means operative and inoperative; a pair of parts of magnetic material adapted to be slidably received within said passage on opposite ends of the train in non-interconnected relationship therewith; an electromagnet mounted on said carriage member for movement therewith for magnetically attracting said parts when positioned adjacent thereto; and means for selectively energizing and de-energizing said electromagnet whereby said electromagnet may be selectively positioned while de-energized relative to the train to a position adjacent either of said parts by means of said positioning means to accomplish selective positioning of the train in opposite directions in said passage.

7. A tube furnace comprising: thermal insulating wall means enclosing a furnace chamber; an elongated member of non-magnetic refractory material extending through said chamber and defining a passage adapted to slidably receive and conduct non-magnetic articles into said furnace chamber; guide means externally disposed with respect to said member and extending parallel thereto; a pair of magnetic parts adapted to be positioned at opposite ends of at least one of the articles within said passage in non-interconnected relationship therewith; magnetic flux generating means movable along said guide means for selectively positioning said parts by magnetic attraction for selectively translating the article in said passage into and out of said furnace chamber.

8. A tube furnace comprising: thermal insulating wall means enclosing a furnace chamber; an elongated member of non-magnetic refractory material extending through said chamber; said elongated member defining a passage adapted to slidably receive and conduct non-magnetic articles into said furnace chamber; guide means externally disposed with respect to said member and extending parallel thereto; a pair of magnetic parts adapted to be slidably received in said passage and positioned at opposite ends of a train of the articles within said passage in non-interconnected relationship therewith; an electromagnet movable along said guide means for selectively positioning the train in said passage into and out of the furnace chamber through selective magnetic attraction with said parts; and means for selectively energizing and de-energizing said electromagnet.

9. Furnace apparatus comprising: thermal insulating wall means enclosing a furnace chamber; an elongated passage defining member of non-magnetic refractory material extending through said chamber and adapted to slidably receive and conduct non-magnetic articles into said furnace chamber; means supporting said wall means for rectilinear movement along the length of the passage defining member; at least one magnetic part adapted to be slidably received within said member; magnetic flux generating means mounted on said wall means for movement therewith in proximity to said passage defining member to magnetically attract said part to position the same and thereby position the objects during rectilinear movement of said wall means.

References Cited by the Examiner

UNITED STATES PATENTS

| 1,779,604 | 10/30 | Knerr | 148—143 |
| 2,269,838 | 1/42 | Wroblewski | 263—6 |
| 2,609,915 | 9/52 | De Burgh | 198—41 |
| 2,676,234 | 4/54 | Lackner et al. | 219—10.67 |
| 2,819,370 | 1/58 | Osborn | 219—10.67 |
| 2,823,289 | 2/58 | Beck | 219—10.41 |

FOREIGN PATENTS

| 545,225 | 8/57 | Canada. |
| 1,155,185 | 11/57 | France. |
| 1,204,545 | 8/59 | France. |
| 746,484 | 3/56 | Great Britain. |

JOHN F. CAMPBELL, *Primary Examiner.*

RAY K. WINDHAM, *Examiner.*